United States Patent
Lucas

(10) Patent No.: US 6,170,145 B1
(45) Date of Patent: *Jan. 9, 2001

(54) METHOD OF SECURING A TERMINATION ELEMENT TO AN END PORTION OF A WIRE ROPE

(75) Inventor: Charles E. Lucas, Tulsa, OK (US)

(73) Assignee: The Crosby Group, Inc., Tulsa, OK (US)

(*) Notice: Under 35 U.S.C. 154(b), the term of this patent shall be extended for 0 days.

This patent is subject to a terminal disclaimer.

(21) Appl. No.: 09/426,069

(22) Filed: Oct. 21, 1999

Related U.S. Application Data

(63) Continuation-in-part of application No. 09/233,642, filed on Jan. 19, 1999.

(51) Int. Cl.[7] ................................................. B21D 39/00
(52) U.S. Cl. ............................... 29/517; 29/282; 29/753; 29/863; 29/505; 72/416
(58) Field of Search ............................... 29/237, 505, 517, 29/282, 753, 863; 72/416

(56) References Cited

U.S. PATENT DOCUMENTS

| | | | |
|---|---|---|---|
| Re. 31,084 | 11/1982 | Birks | 72/416 |
| 2,151,032 | 3/1939 | Jensen | 29/148 |
| 2,247,928 | 7/1941 | Temple, Jr. | 287/75 |
| 2,346,412 | 4/1944 | Bratz | 29/148 |
| 2,359,084 * | 9/1944 | Carlson | 140/113 |
| 2,413,547 | 12/1946 | Davidson | 140/113 |
| 2,587,095 | 2/1952 | Bergan | 287/109 |
| 2,622,314 | 12/1952 | Bergan | 29/148 |
| 2,758,491 * | 8/1956 | Buchanan | 81/15 |
| 3,006,983 | 10/1961 | McDurmont | 174/94 |
| 3,101,766 | 8/1963 | Floyd, Jr. | 153/1 |
| 3,146,519 * | 9/1964 | Redwine | 29/155.55 |
| 3,201,859 * | 8/1965 | Stanley | 29/282 |
| 3,216,091 * | 11/1965 | Floyd, Jr. | 29/155.55 |
| 3,373,474 * | 3/1968 | Doerer | 29/237 |
| 3,561,251 * | 2/1971 | Matsumoto | 72/416 |
| 3,745,633 * | 7/1973 | Langewis | 29/252 |
| 4,047,420 | 9/1977 | Edwards | 72/416 |

(List continued on next page.)

FOREIGN PATENT DOCUMENTS

| | | | |
|---|---|---|---|
| 724888 | 5/1969 | (BE) . | |
| 744104 * | 10 1966 | (CA) | 29/282 |
| 2690212 | 10/1993 | (FR) | F16G 11/02 |
| 968220 | 9/1964 | (GB) | 72/416 |
| 1 249 352 | 10/1971 | (GB) . | |
| 1812992 | 7/1969 | (NL) . | |
| PCT/GB94/ 02025 | 9/1993 | (WO) . | |

OTHER PUBLICATIONS

Wire Rope Users Manual, Third Edition, Wire Rope Technical Board, Woodstock, Maryland, 1993.
"An Introduction to CCL Group PLC", CCL Systems, Talurit Division, Leeds, 01994.

* cited by examiner

Primary Examiner—I Cuda Rosenbaum
Assistant Examiner—Essama Omgba
(74) Attorney, Agent, or Firm—Head, Johnson & Kachigian

(57) ABSTRACT

A method of securing a termination element to an end portion of a wire rope, the termination element having an elongated, ductile tubular sleeve portion, including the steps of positioning the end portion of a wire rope within the tubular sleeve portion, positioning the sleeve portion between co-acting dies, the dies having an opening that is non-circular in cross-section, closing the dies a first time to deform the sleeve portion about the wire rope and into a non-circular external cross-section shape opening dies rotating the sleeve portion less than 180° closing the dies a second time to form the sleeve portion into a final external non-circular shape and opening the dies to remove the termination element.

12 Claims, 9 Drawing Sheets

U.S. PATENT DOCUMENTS

| | | | |
|---|---|---|---|
| 4,067,224 * | 1/1978 | Birks | 72/416 |
| 4,068,962 | 1/1978 | Birks | 403/212 |
| 4,365,501 | 12/1982 | Potts | 72/416 |
| 4,461,063 * | 7/1984 | Patton | 29/175 R |
| 4,976,132 | 12/1990 | Shaffer | 72/416 |
| 5,007,667 * | 4/1991 | Unewisse et al. | 285/382.2 |
| 5,121,625 | 6/1992 | Unewisse et al. | 72/416 |
| 5,152,630 | 10/1992 | Walloch | 403/284 |
| 5,692,294 * | 12/1997 | Casey | 29/753 |
| 5,816,094 | 10/1998 | Birks | 72/416 |
| 6,035,692 * | 3/2000 | Lucas | 72/416 |

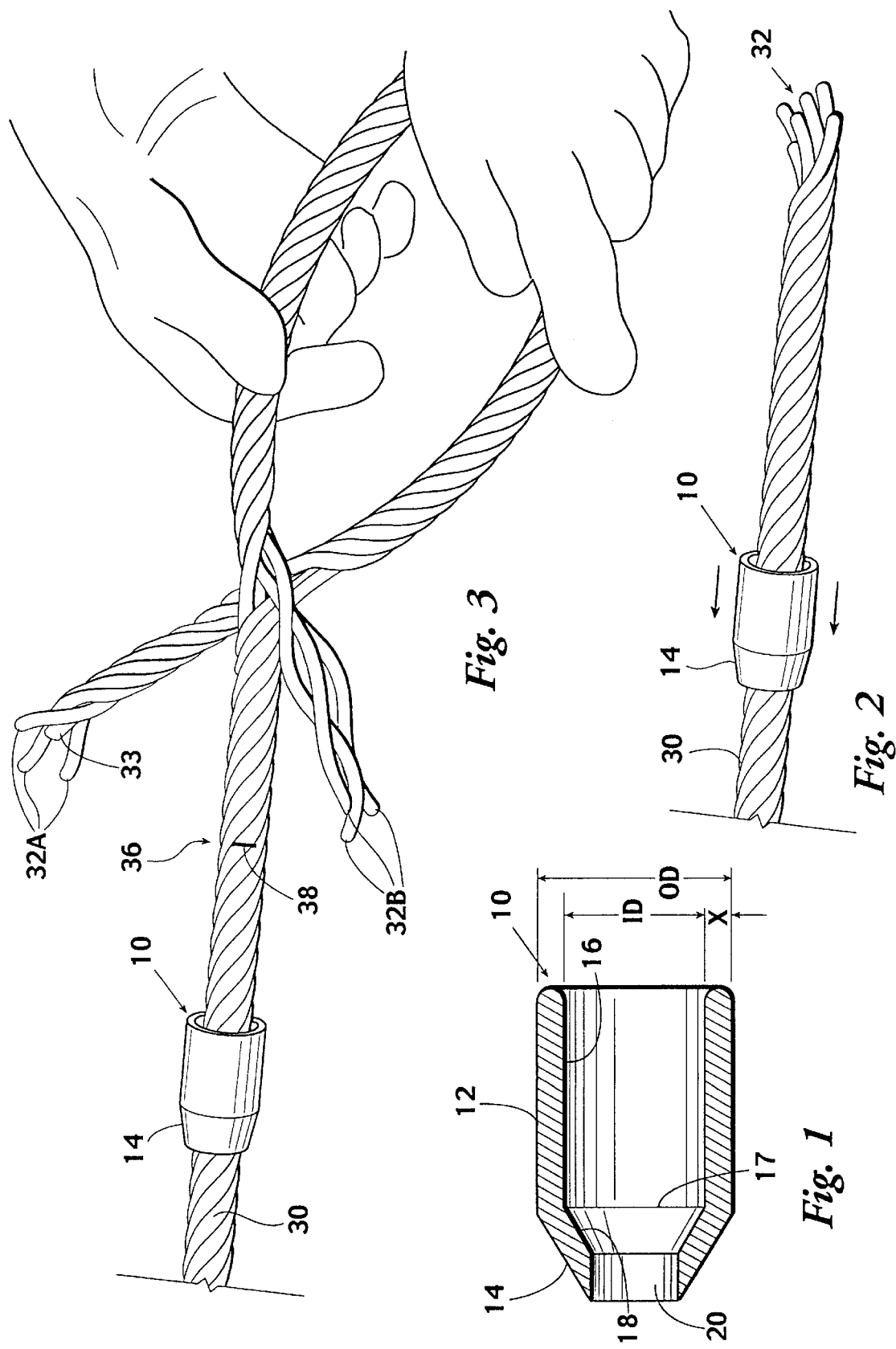

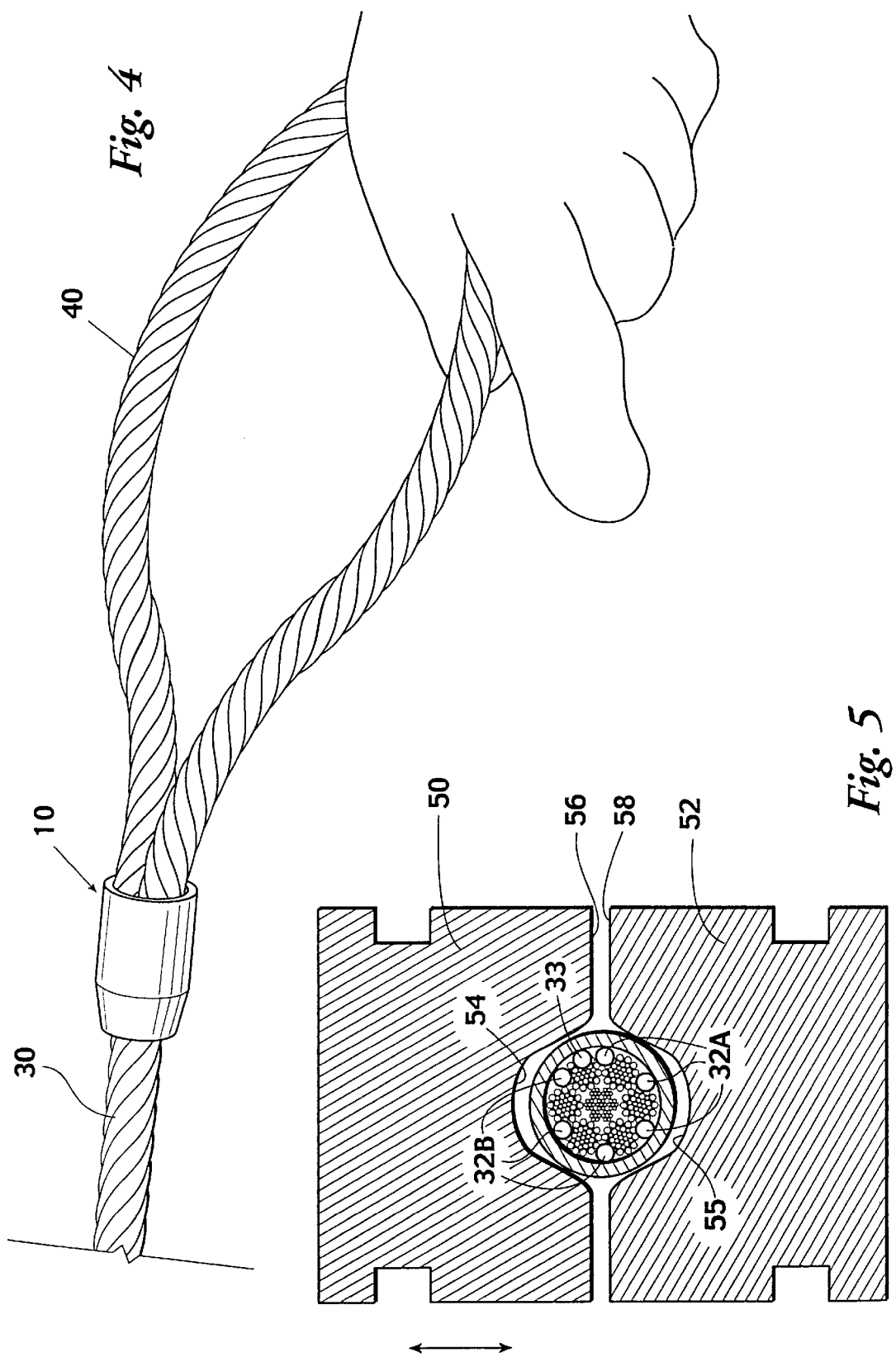

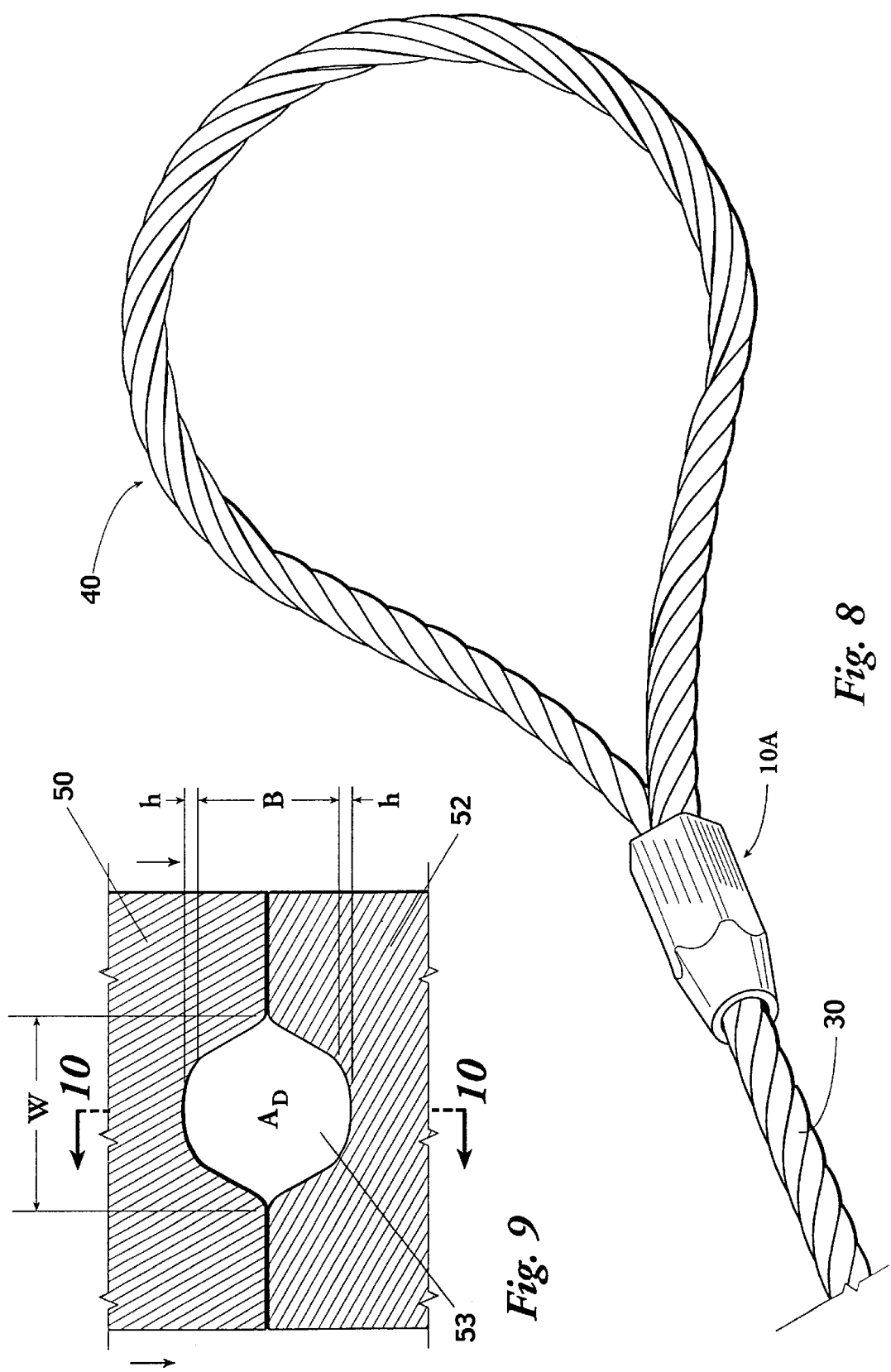

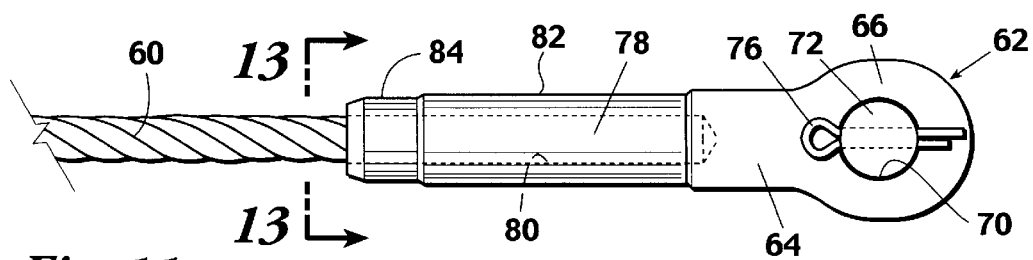
*Fig. 11*
PRIOR ART
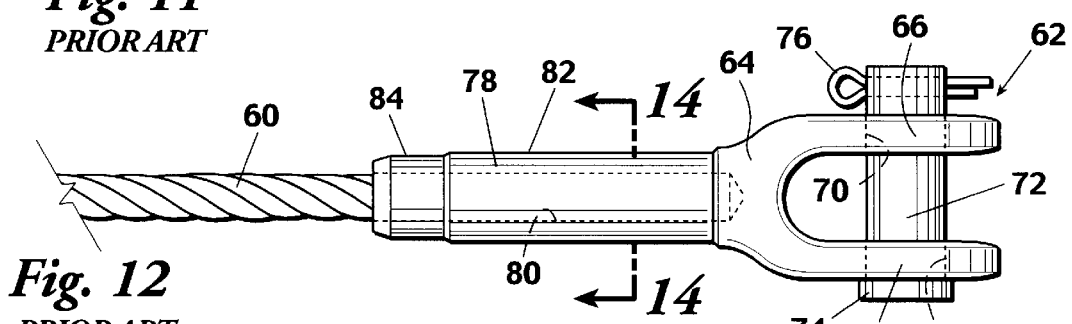
*Fig. 12*
PRIOR ART
*Fig. 13*
PRIOR ART
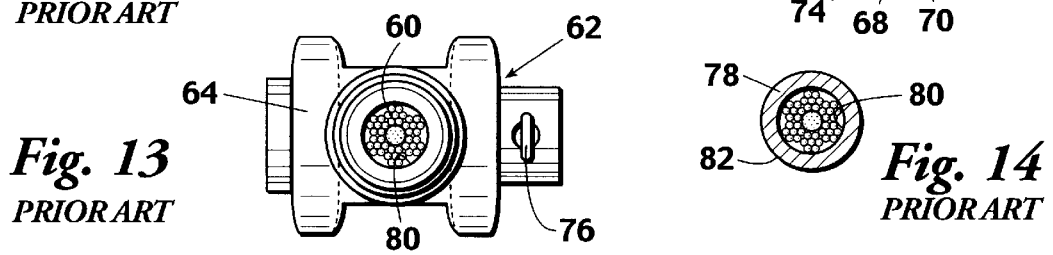
*Fig. 14*
PRIOR ART
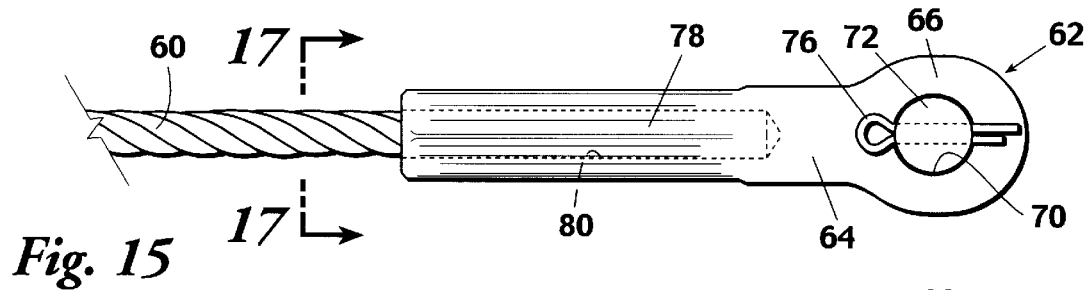
*Fig. 15*
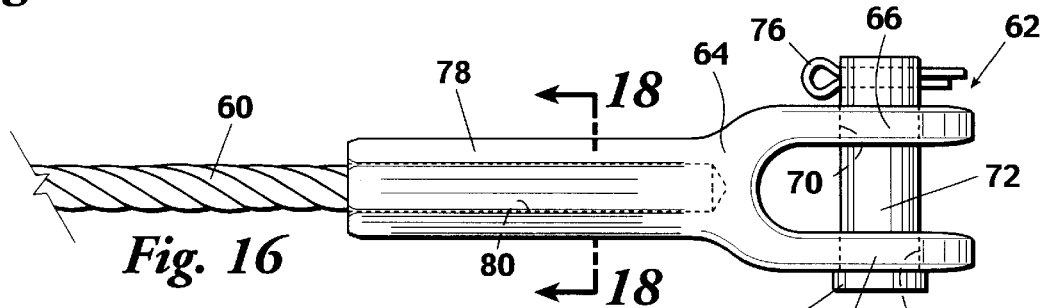
*Fig. 16*
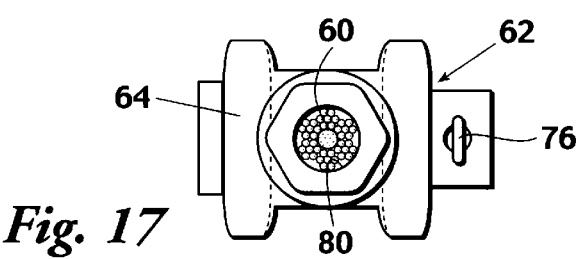
*Fig. 17*
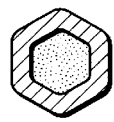
*Fig. 18*

METHOD OF SECURING A TERMINATION ELEMENT TO AN END PORTION OF A WIRE ROPE

REFERENCE TO PENDING APPLICATIONS

This is a continuation-in-part of U.S. patent application Ser. No. 09/233,642 filed Jan. 19, 1999 entitled, "TWO PASS METHOD AND APPARATUS FOR FORMING A HEXAGONAL SWAGE FOR WIRE ROPE TERMINATIONS".

REFERENCE TO MICROFICHE APPENDIX

This application is not referenced to any Microfiche Appendix.

BACKGROUND OF THE INVENTION

1. Field of the Invention.

The present invention is directed to a swaging process and apparatus to produce efficient terminations in wire rope. In particular, the present invention is directed to a method involving a swaging process and apparatus for use in the method to convert a cylindrical swaging sleeve surrounding a wire rope into a sleeve having a non-circular external cross-sectional shape. In a particular application, the method of this invention is useful in attaching swage socket type termination elements to the end portion of a wire rope. Such swage socket terminations are typically either an open swage socket wherein the termination element has spaced apart parallel integral tang portions or the swage socket is a closed swage socket in which the termination element has a body portion with an opening through it.

2. Prior Art.

Wire rope termination fittings generally comprise cylindrical swaging sleeves that are used in a variety of wire rope terminations. Typically, swaging sleeves are externally and internally cylindrical and sized to receive therein a particular size of wire rope. A sleeve typically used to form a wire rope sling eye, particularly of the Flemish-eye splice form of termination, is cylindrical with one end being tapered, such sleeves form the termination by swaging, i.e., cold forming the sleeve to form a strong union with the wire rope. Such swages and methods for forming them are known in the prior art and described in the NATIONAL SWAGE CATALOG of The Crosby Group, Inc.

In the prior swage forming processes, a round sleeve is positioned at the termination point and then placed within open co-acting cylindrical dies. The shape of the cylindrical die represents the size of the finished swage for a given size of wire rope identified as the "after swage dimension". The prior art process requires that the co-acting dies are closed partially to approximately one-half the distance from the time initial contact is made between the sleeves and the dies. The die is then opened and the sleeve is rotated. This step is repeated upwards of 3 to 4 times until the dies actually close and abut to create the after swage dimension sufficient to sustain the working load limits for a given wire rope size. As the size of the wire rope increases even more repeated turning of the sleeve and multiple pressing is required.

One pass swaging has been taught in the prior art such as U.S. Pat. No. 2,151,032; British Patent 1,249,352, dated Oct. 13, 1971; and PCT/GB94/02025 filed Sep. 16, 1994. Such a method and apparatus will create unwanted "flash" of swage material between the die "land" surfaces if the dies are closed too much during the first and second swaging passes.

BRIEF SUMMARY OF THE INVENTION

The present invention is directed to a further improved apparatus and method of creating a swage of correct after-swage dimension for a given working load limit, based upon the size of wire rope, in fewer passes than required with conventional round cross-sectional cavity dies. The working load limit is defined as the maximum mass or force that the product is designed to support in general service when a pull is applied to the wire rope, plus a design (safety) factor. This factor is the product's theoretical reserve load capability computed by dividing the catalog ultimate load by the working load limit. This is generally expressed as a ratio, e.g., 5:1.

A further object of the invention is to provide a process for creating a wire rope termination wherein a round or cylindrical sleeve is die formed by a two pass (or multi-pass) method of compression into a non-circular external shape that can be multi-sided, polygonal, such as an outer hexagonal, shape. To practice the invention, the round sleeve is positioned within co-acting dies having abutting lands. At least one of the co-acting dies possesses a reservoir area to allow the sleeve to flow into the reservoir area upon compression. This prevents sleeve material (flash) from flowing into the area between the abutting lands. In the preferred embodiment, the dies are closed a first time to form the sleeve into a quasi-hexagonal shape. The quasi-hexagonal sleeve will approximate the shape of a hexagon except for the side or sides that are exposed to a reservoir area in a die. The co-acting dies are then opened and the sleeve is rotated. The co-acting dies are then again closed, forming the sleeve into a final quasi-hexagonal shape. During the forming process, each time the dies are closed, the lands of the co-acting dies abut. This fact greatly decreases operator attention associated with prior swaging processes. After a double pass utilizing the method described herein, a properly formed swage at the termination point of the wire rope with the after swage dimensions to produce the proper working plus design factor load limits for the size of wire rope is formed.

Specifically, the invention is directed to opposing hexagonal, or polygonal die cavities, wherein at least one, preferably two, of the oppositely facing sides include a reservoir area for swage material to flow at a first full closing of the dies, i.e. the die land surfaces abut. A method includes a second step of rotating the swage less than 180° followed by a second full closing of the dies. The invention being preferably directed to using such method and apparatus in one embodiment, to form a Flemish-eye wire rope sling. A third pass may be required where there is excess clearance in the guide supports of the hydraulic swaging machine.

One aspect of the invention is a method of securing a swage socket termination element to an end portion of a wire rope. Swage socket terminations can occur in various forms but are usually two primary forms. The first is commonly called an open swage socket. This type of device has a body portion with two integrally extending parallel tang portions. The tang portions typically have aligned openings at the outer end so that a bolt or other type of key member may be inserted through the openings by which the open swage socket can be secured to some other piece of equipment. The open swage socket has an integral elongated tubular member, the end portion of a wire rope being receivable in the tubular portion. The open swage socket is secured to the end portion of wire rope by cold flowing or deforming the integral tubular portion around the end portion of the wire rope. This invention is concerned with an improved way of deforming the integral tubular portion of an open swage socket to secure it to the end portion of a wire rope.

Another type of swage socket is called a closed swage socket. It is similar to the open swage socket except that the body portion of the closed swage socket has an opening through it, that is, it does not have integral extending tang portions. A closed swage socket has an integrally elongated tubular portion that receives the end portion of a wire rope. The tubular portion is deformable by cold flow to form around and attached to the wire end portion.

DESCRIPTION OF THE DRAWINGS

FIG. 1 is a cross-sectional view of a typical swaging sleeve as used in this invention.

FIGS. 2, 3 and 4 illustrate the process of pre-forming a wire rope Flemish-eye splice.

FIGS. 5, 6, 6A and 7 depict the swaging apparatus and process of this invention.

FIG. 8 is a perspective view of a completed termination.

FIG. 9 is an elevation view of the co-acting dies.

FIG. 11 is a side view of an open swage socket termination element receiving the end portion of a wire rope. The termination element and wire rope of FIG. 11 all are of existing prior art designs. The invention is concerned, not with the structure shown in FIG. 11, but with the method of deforming the integral tubular sleeve portion of the open swage socket to secure it to the wire rope.

FIG. 12 is a top view of the open swage socket and cable of FIG. 11.

FIG. 13 is a cross-sectional view taken along the line 13—13 of FIG. 11 showing the wire rope in cross-section and an end view of the open swage socket. This Figure also represents the prior art.

FIG. 14 is a cross-sectional view of the tubular portion of the open swage socket taken along the line 14—14 of FIG. 12 and represents the prior art.

FIG. 15 is a side view of an open swage socket termination secured to the end portion of a wire rope by the method of this invention in which the open swage socket integral tubular portion has been deformed in a unique way to close upon the wire rope end portion.

FIG. 16 is a top view of the open swage socket secured to the end portion of a wire rope by the improved method of this invention.

FIG. 17 is a cross-sectional view of the wire rope and the open swage socket after it has been secured to the wire rope according to the method of this invention taken along the line 17—17 of FIG. 15.

FIG. 18 is a cross-sectional view taken along the line 18—18 of FIG. 16 showing the integral tubular portion having been secured to the end portion of a wire rope according to the principles of this invention, the open swage socket integral tubular portion being shown in cross-section.

FIGS. 19–21 show a closed swage socket termination element and wire rope of known prior art design before the swage socket is secured to the wire rope.

DETAILED DESCRIPTION OF THE PREFERRED EMBODIMENT

Figure 6:
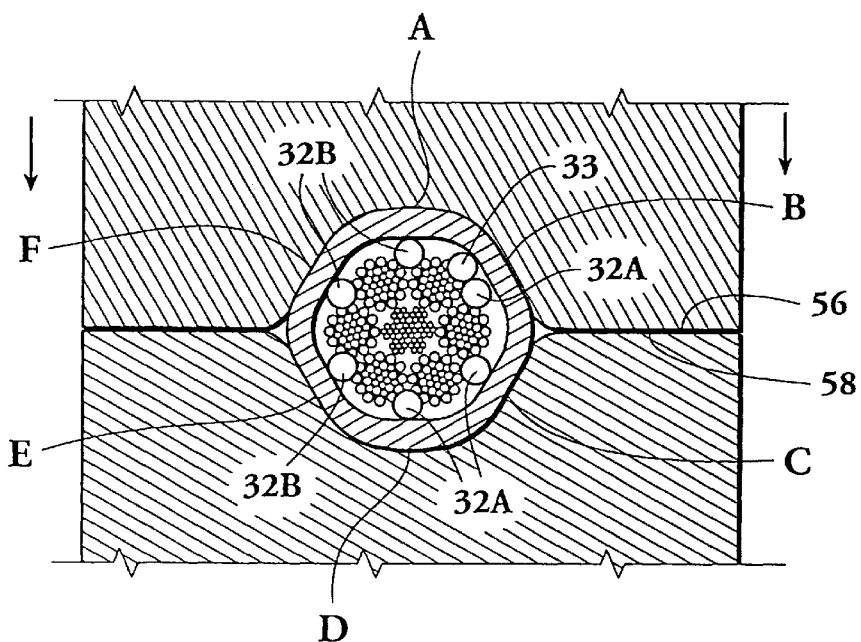

Referring now to FIG. 1, the steel sleeve as used in this invention and as described in the prior art includes a cylindrical body that is generally designated by the numeral 10 and includes exteriorly a cylindrical body portion 12 of a given OD and a tapered end portion 14. Internally, the sleeve is made up of a cylindrical portion 16 of given ID which terminates at 17 with an internally tapered end 18 and a circular opening 20 that is a size larger than the wire rope size. For instance, using a 1" (25–26 cm) wire rope, opening 20 would be designed approximately larger than 1" while the internal diameter of cylindrical portion 16 is designed approximately to accept the grouping of all wires which comprise tail ends 32A, 32B and running line 30. Such sleeves have ductility sufficient to cold flow plastically at the termination. One such sleeve is sold by The Crosby Group, Inc. under the trademark, "COLD TUFF"®.

The concepts of this invention are particularly applicable to the utilization of a standard round steel sleeve in the construction of a Flemish-eye splice at the end of a wire rope but is not limited thereto. Such eye splices and slings are common and useful in conjunction with other hoisting and lifting equipment. The process in accordance with the invention is shown in FIGS. 2 through 8. The so-called Flemish-type wire rope sling eye is a mechanical splice of the strands of wire rope. A running portion 30 of the wire rope includes a tail end, generally designated by the numeral 32. As is well known, wire rope is built up of strands of wire laid together. A standard wire rope is typically made of six wire strands and a core. Each strand can be made up of a number of individual wires. The wire strands are helically laid around the core either to the right or to the left with the resulting rope designated as a right-lay or a left-lay. In the Flemish-eye splice, the rope body is opened or unlayed into two parts, one having three strands and the other having the remaining three strands and the case. The rope is unlayed far enough back to allow the loop or eye to be formed by looping one part in one direction and the other part in the other direction.

The core of some wire rope is made of some form of wire or fiber which adds additional strength to the rope. Wire rope is classified as, for example, as "6×19"; the first number being the number of strands in the rope and the last number the number of wires in a strand. If there is a wire core, the wire is labelled IWRC (Independent Wire Rope Core). The total metal sectional area of a wire rope is important in the design of the co-acting dies and the process of this invention which will be hereafter detailed. The percentage of unfilled voids is known as the air gap percentage.

As shown in FIGS. 2 and 3, the strands of the tail end 32 are separated into two parts, generally designated as 32A and 32B with a core 33. The sleeve 10 is placed on the running line 30 in the direction as shown. The two parts of the tail end are then re-laid upon the running line 30 to form the eye. The two ends 32A and 32B will then extend to a point 36, which may have been previously marked at 38 which becomes the area of termination. The next step is to slide sleeve 10 forward to the termination point 36 which will encircle the re-laid wire rope forming the spliced Flemish-eye generally designated by the numeral 40 as shown in FIG. 4. Up to this point, the process is that which has been well known in the art, and ordinarily, the sleeve would be placed within a round co-acting die in a hydraulic swage to form the swage in a plurality of rotations and passes until the proper after-swage dimension has been reached and gauged. This invention, however, is directed to forming a quasi-hexagonal swage from the round sleeve 10 by the utilization of co-acting dies by a two pass method as shown in FIGS. 5, 6, 6A and 7.

Co-acting dies 50 and 52 are used in a typical hydraulic swaging machine capable of applying many tons of pressure with a lower die 52, generally being fixed within the machine, while die 50 is vertically moveable or vice-versa as shown by the arrows. The die of this invention comprises a quasi-hexagonal opening 53. When the upper land 56 and lower land 58 abut, the cross-sectional area of opening 53 is critical to the successful formation of a proper quasi-hexagonal after swaged termination. The upper and lower die each contain, in this embodiment, three sides forming the quasi-hexagonal cross-section but wherein uppermost surface 54 and lowermost surface 55 of the opening are not flat but instead are outwardly curved in a "dome" shape to create a reservoir 51 for swage material during the first pass as shown in FIG. 6.

Figure 6A:
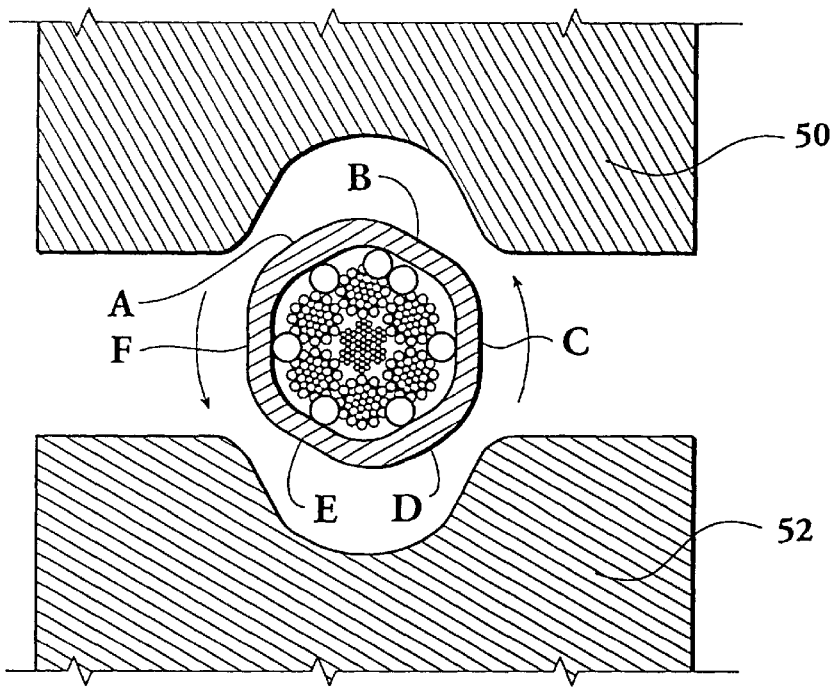
Figure 7:
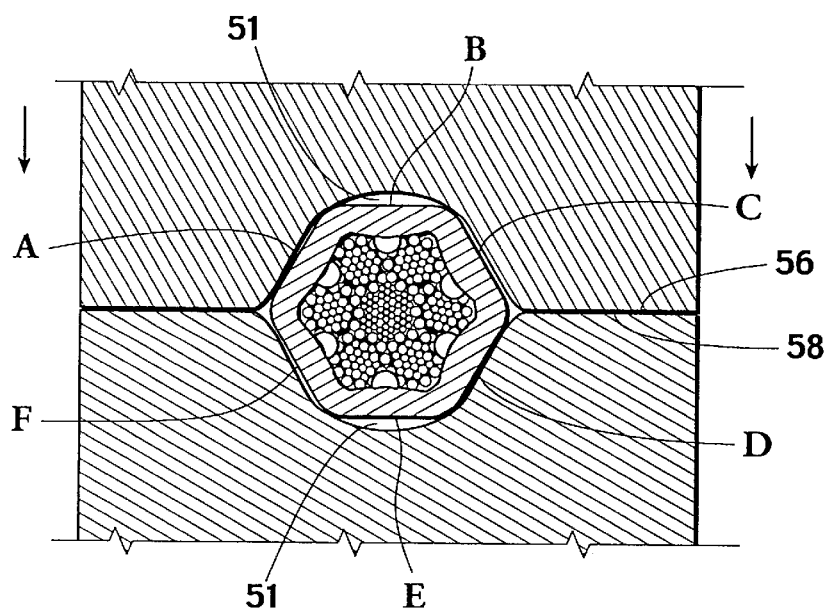

The assembled sleeve as shown in FIG. 4 at the termination area is positioned within the lower die 52, and by way of hydraulic pressure, the die or dies are forced together to apply pressure against the sleeve. Some light oil lubricant is applied to the sleeve. As shown in FIG. 5, the die begins to close upon the cylindrical sleeve 10 to form a pre-formed polygonal, preferably a quasi-hexagonal swage having sides A, B, C, D, E and F, shown in FIGS. 6 and 6A. Other even numbered polygonal shapes greater than six are inclusive of the invention. The purpose of the "dome" shaped reservoir surfaces 54 and 55 for sides A and D is to form an area 51 into which the material of the sleeve can flow. As such, the dies will not form "flash" or pinch excess material between lands 56 and 58 before closure. As shown, hydraulic pressure is applied to the dies until lands 56 and 58 abut as shown in FIG. 6. After closing upon the sleeve, the die is opened revealing a swage formed in a quasi-hexagonal shape. The next step in the process is to rotate the preformed swage one side or, in this case, 60° to the position such as is shown in FIG. 6A. Closing the dies, at this point, the ductile metal sleeve actually compresses the wire rope and core and flows plastically into the valleys and spaces between component strands as shown in FIG. 7. The die jaws are opened and the finished swaged Flemish-eye is removed creating, at the termination area, the final quasi-hexagonal swage form generally designated by the numeral 10A as shown in FIG. 8.

Figure 10:
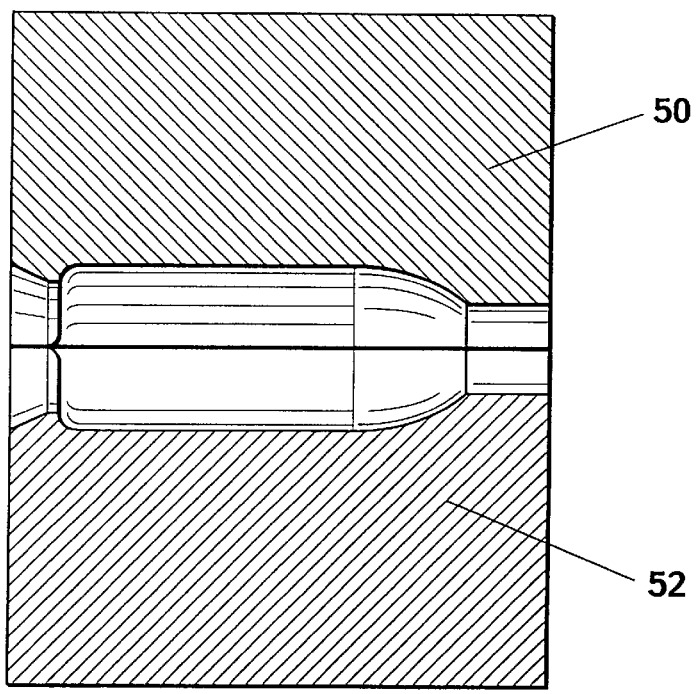
FIG. 10 is a cross-sectional view of one of the co-acting dies.
Figure 19:
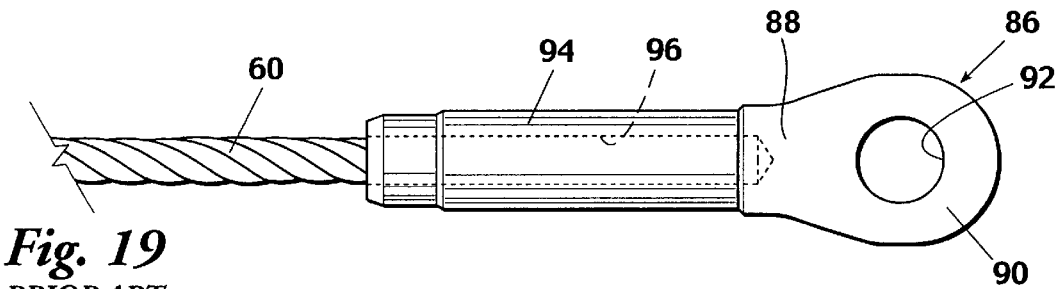
FIG. 19 is a side view of a closed swage socket termination element receiving the end portion of a wire rope.
Figure 20:
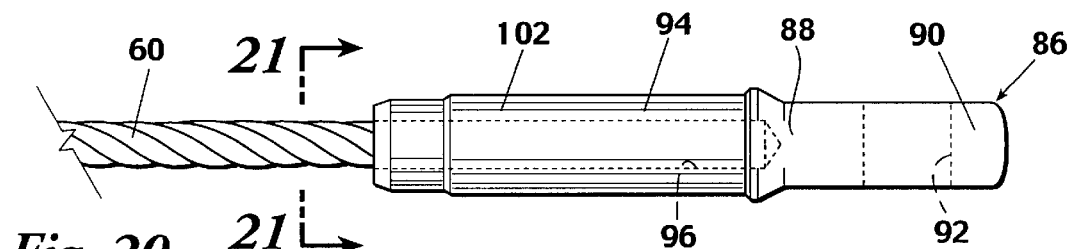
FIG. 20 is a top view of the closed swage socket termination elements as seen in FIG. 19.
Figure 21:
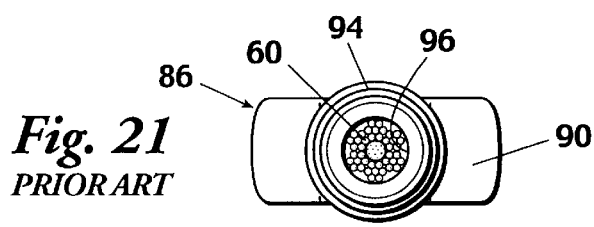
FIG. 21 is a cross-sectional view taken along the line 21—21 of FIG. 20.
Figure 22:
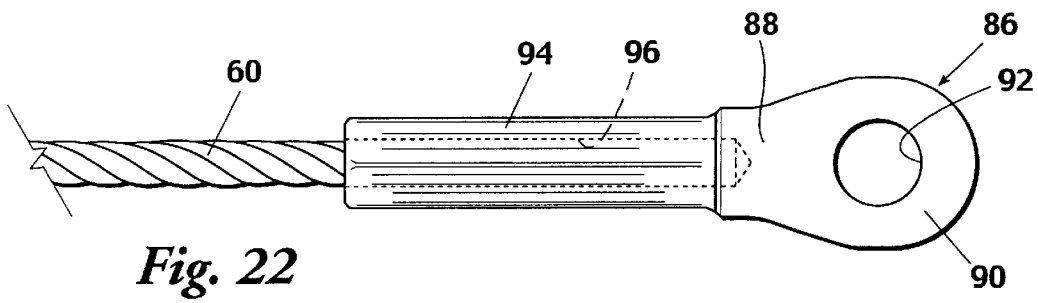
FIG. 22 is a side view of a closed swage socket having been attached to the end portion of a length of wire rope employing the method of this invention wherein the integral tubular portion of the closed swage socket is deformed in a unique way.
Figure 23:
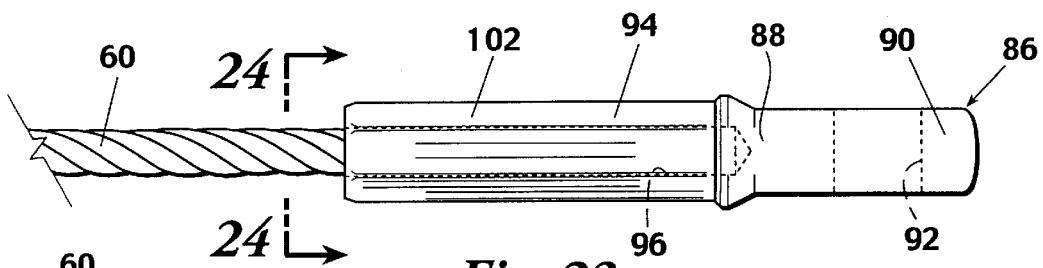
FIG. 23 is a top view of the closed swage socket attached to a wire rope as in FIG. 22.
Figure 24:
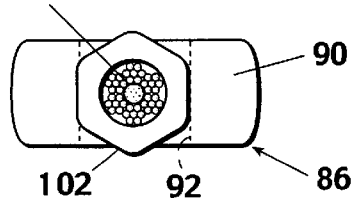
FIG. 24 is a cross-sectional view of the wire rope taken along the line 24—24 of FIG. 23 showing the external configuration of the closed swage socket integral tubular portion after it has been deformed employing the methods of this invention.

FIG. 10 illustrates a cross-sectional view of the dies 50 or 52.

An important aspect of the invention is the design of the cross-sectional area of the cavity of the co-acting dies designated, as shown in FIG. 9, as $A_D$, including the width "W" and the space between flats "B". The design of a die cavity for a Flemish-eye splice termination can be expressed by the following arithmatic steps:

First, the sleeve metallic cross-sectional area is determined:

$$A_S = (OD^2 - ID^2) \cdot \frac{\pi}{4}$$

The metallic rope area is calculated:

$$A_r = (D_R^2 \cdot A_f)$$

Where: $D_R$=Diameter of rope
$A_f$=Metallic area factor from wire rope users manual as published by The Wire Rope Technical Board The hexagonal die area not including the domed shaped reservoir areas 53 is then calculated:

$$A_D = \text{TAN}30°(6)\left(\frac{B}{2}\right)^2$$

Where: B=after swage dimension across flats

It is known that the swaging process will crimp and bring together the individual wire strands within the sleeve. A balance should be found between a tight swage and cutting the wire rope strands which reduces efficiency. Since there will not be total compression, the unfilled voids in cross-section within the swage are known as the air gap.

The air gap percent is found:

$$\text{Air Gap\%} = \frac{A_D - (2A_r + A_S)}{A_r} \cdot 100$$

which must be equal to or less than 40%.

The percentage width of the die cavity to the sleeve OD is found:

$$W\% = \frac{2\left(\frac{B}{2}{\cos 30°}\right)}{OD} \cdot 100$$

and is to be equal to or greater than 90% of the sleeve OD.

An example of a typical height, "h" of the domed shaped area is a height of 1/16" in a die area designed to produce a 3/4" hexagonal swage.

Although the invention is described relative to a Flemish-eye form of termination, the concepts are applicable to other termination forms. Examples include creating hexagonal swage terminations of what is known as a cylindrical swage sockets such as described in the NATIONAL SWAGE catalog of The Crosby Group, Inc. Also, inclusive of the invention is creating a hexagonal swage of an oval sleeve for what is known as a turnback eye (i.e., wire rope upon wire rope) form of termination as described in the aforesaid NATIONAL SWAGE catalog. The invention is further adapted to wire rope swage buttons as shown in the aforesaid catalog.

While the description of the invention directed to FIGS. 1–10 has been primarily concerned with a way of practicing the invention to form what is known in the trade as an "Flemish-eye splice", the invention is by no means limited to this specific type of wire rope termination. Rather than a Flemish-eye splice, or other type of splice in which an integral loop is formed at the end of a wire rope, termination devices are frequently employed. Two common types of termination devices are called the "open swage socket" and the "closed swage socket". FIGS. 11–17 show an open swage socket of the type commonly secured to the end of a wire rope while FIGS. 19–24 show a closed swage socket. The invention herein is particularly adaptable to attaching these swage socket type of termination elements to a wire rope.

As shown in FIGS. 11–14 a wire rope 60 and an open swage socket generally indicated by the numeral 62. Open swage socket 62 has a body portion 64 that has, integrally extending from it, parallel and spaced apart tang portions 66 and 68. Each of the tang portions 66 and 68 has an opening 70 therein, the aligned openings receiving a pin 72, the pin having an enlarged head 74 at one end and a small diameter transferase opening at the other end that typically receives a cotter key 76. Integrally extending from body portion 64 is an elongated tubular portion 78 that has an opening 80 therein that receives the end portion of wire rope 60. Tubular portion 78 typically has a cylindrical external surface 82. In the embodiment illustrated in FIGS. 11 & 12 the external surface has a reduced diameter end portion 84 that is provided in accordance with an invention covered in U.S. Pat. No. 5,152,630 to provide a way of quickly determining whether or not the swage socket 62 has been secured to cable wire rope 60. The invention covered by U.S. Pat. No. 5,154,630 provides, in a very generalized summary, a system in which the reduced end portion 84 substantially disappears when crimping action is applied to tubular portion cylindrical external surface 82 to attach the swage socket 62 to wire rope 60, thereby providing a visual indication which is known by the trademark, "QUIC-CHECK", the trademark being owned by The Crosby Group, Inc. The provision of the reduced diameter portion 84 is not a part of this invention. The invention disclosed herein is practiced the same whether or not the external cylindrical surface 82 of the swage socket tubular portion 78 has reduced external diameter portion 84 or does not have such reduced diameter portion.

In the present practice, the method of securing the open swage socket 62 to wire rope 60 is to assemble it in the manner illustrated in FIGS. 11–14 and then subject the integral tubular portion 78 to a die having semi-circular recesses therein to swage the tubular portion 78 to reduce the internal diameter of opening 80 to cause it to conform, at least in part, to the external configuration of the wire rope 60. In the final attachment utilizing the present state of the art, prior to this invention, the completed and attached open swage socket 62 maintains an integral tubular portion 78 that is essentially circular in external cross-sectional shape.

Figure 25:
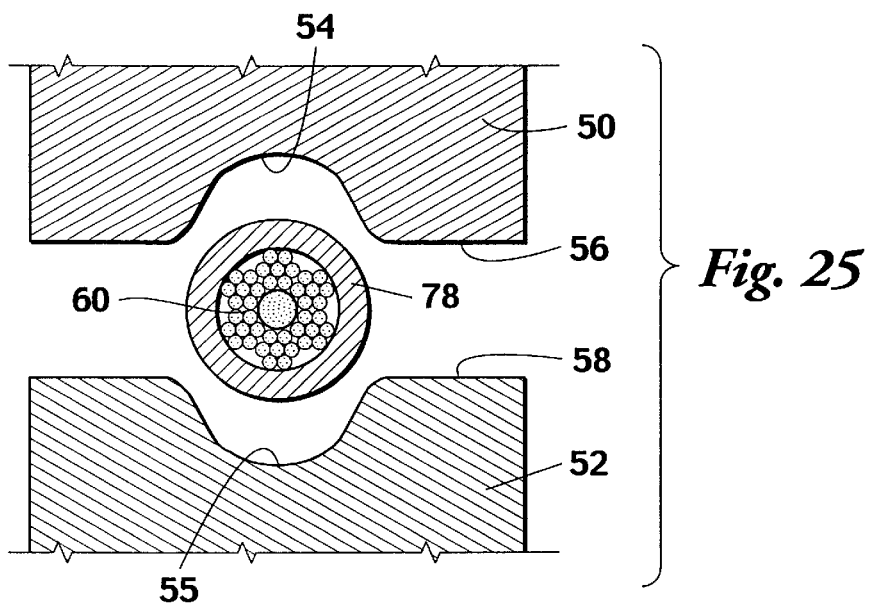
FIG. 25 is an elevational cross-sectional view showing an upper die and a lower die as used in practicing the method of this invention and showing in cross-section the integral elongated tubular portion of a termination element, such as a open swage socket or closed swage socket, with the end portion of a wire rope received within the termination element integral tubular portion.
Figure 26:
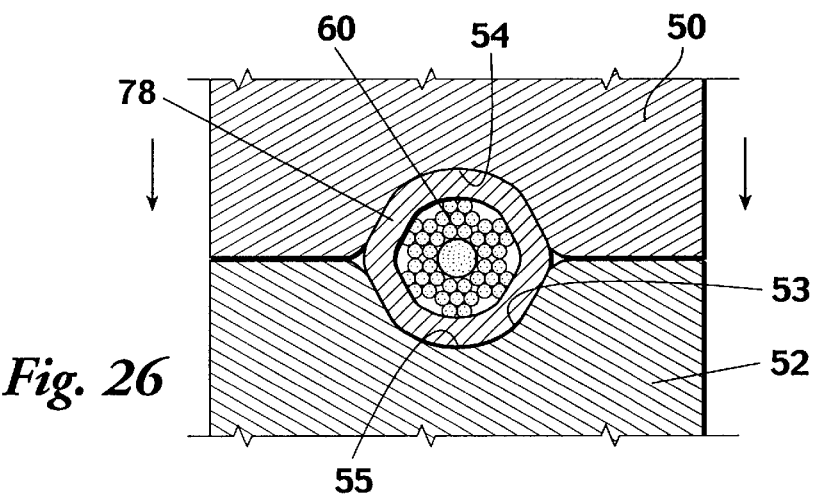
FIG. 26 shows the dies forced together to deform the termination element integral tubular portion.
Figure 27:
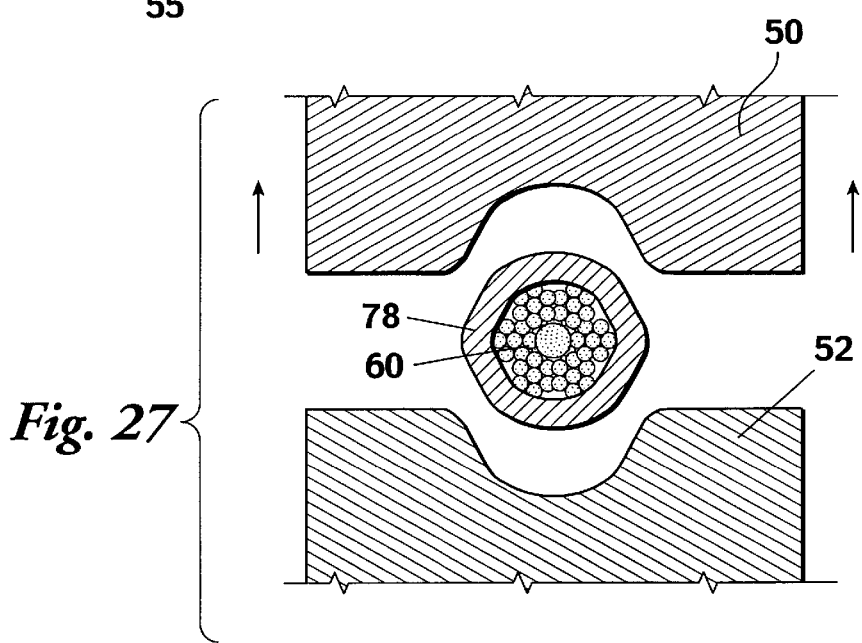
FIG. 27 shows the dies being opened to release pressure on the termination element integral tubular portion.

The method of this invention of attaching the open swage socket 62 to wire rope 60 is illustrated in FIGS. 24–29 to which reference will now be had. In the new concept disclosed herein, wire rope 60 is attached to open swage socket 62 by cold flowing or swaging the integral tubular portion 78 of the swage socket utilizing opposed die portions 50 and 52 that have non-circular configuration (see FIGS. 25–30). Dies having this configuration have been previously described with reference to FIGS. 5, 6, 6A, 9 and 10. The dies of this invention provide an opening, when the dies are closed as in FIG. 26, that is non-circular. The specific configuration of the opening in the closed dies of FIG. 26 is quasi-hexagonal. The die of this invention comprises a quasi-hexagonal opening 53. When the upper land 56 and lower land 58 abut, the cross-sectional area of opening 53 is critical to the successful formation of a proper quasi-hexagonal after swaged configuration of the open swage socket tubular portion 78. The upper and lower die each contain, in the illustrated embodiment, three sides forming the quasi-hexagonal cross-section but wherein uppermost surface 54 and lowermost surface 55 of the opening are not flat but instead are outwardly curved in a "dome" shape to create a reservoir 51 for swage material during the first pass as shown in FIG. 26.

As shown in FIG. 26, die 50 closes upon the cylindrical tubular portion 78 to form a pre-formed polygonal (quasi-hexagonal in the illustrated embodiment). Other polygonal shapes are inclusive of the invention. The purpose of the "dome" shaped reservoir surfaces 54 and 55 is to form an area 51 into which the material of the sleeve can flow so that the dies will not form 'flash' or pinch excess material between lands 56 and 58 before closure.

Figure 28:
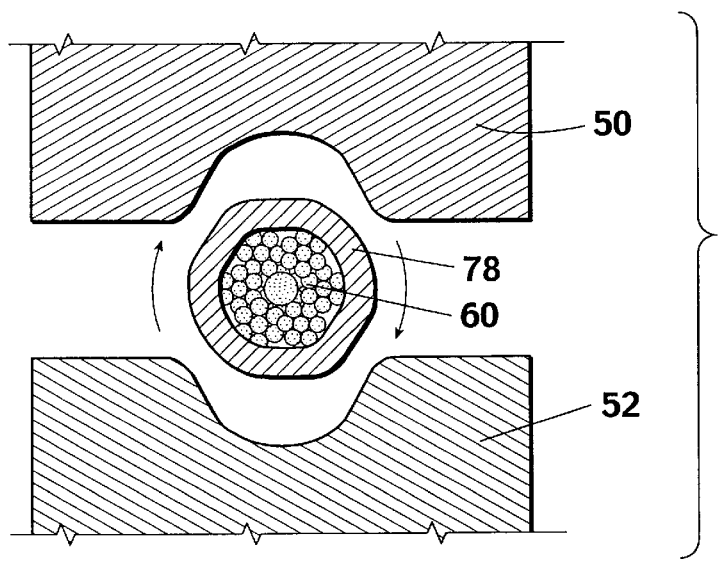
FIG. 28 shows the integral tubular portion rotated with respect to the dies.
Figure 29:
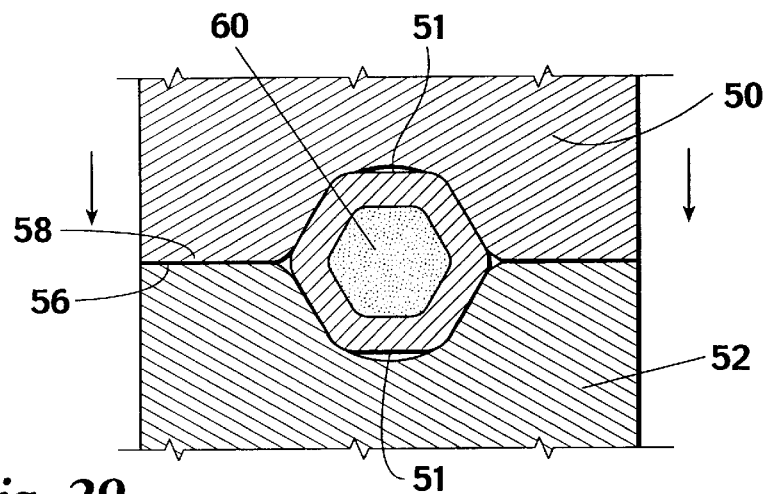
FIG. 29 shows the dies again closed onto a termination element integral tubular portion.
Figure 30:
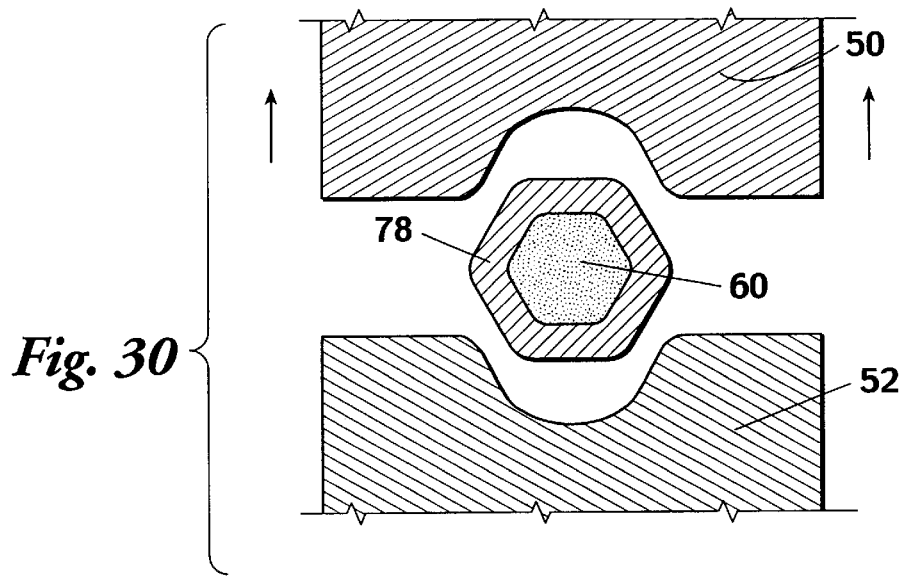
FIG. 30 shows the dies being open and the final configuration of the integral tubular portion of a termination element.

After closing upon tubular portion 78 the die is opened revealing a swage formed in a quasi-hexagonal shape. The next step in the process is to rotate the preformed tubular portion 78 as shown in FIG. 28 to the position such as is shown in FIG. 29. Closing the dies a second time cold flows the ductile metal compresses wire rope 60 and flows plastically into the valleys and spaces between component strands of the wire rope as shown in FIG. 30. The die jaws are opened and the finished swaged tubular portion 78 of swage socket 62 is removed creating, the tubular portion 78 having a final quasi-hexagonal swage form as seen in FIG. 30.

In the broadest concept of practicing the invention, the configuration of the opening formed when the dies 50 and 52 are closed upon each other that is, when land's 56 and 58 are in contact, is non-circular. By "non-circular" it is meant a pre-determined geometrical cross-sectional configuration which may be, as in the illustrated embodiment, hexagonal and could obviously also be octagonal or any other symmetrical external configuration or the dies could form an opening of other non-circular configurations of pre-selected shape. The essence of the invention is that the shape of the dies that form the opening is non-circular and arranged to produce a pre-selected external configuration on the termination element such as an open or closed swage socket.

As shown in FIG. 28, and as previously stated, the termination member integral tubular portion 78 is rotated a pre-selected number of degrees which is less than 180°. In the illustrated arrangement wherein the final desired external configuration is hexagonal, the integral tubular portion is rotated 60°. For other ultimately desired external cross-sectional shapes of the termination element tubular portion the amount of rotation will be more or less but in all events less than 180°. After the tubular element has been rotated as illustrated in FIG. 28 the dies are again closed as shown in FIG. 29 to further conform the external surface of the termination element integral tubular portion to the desired configuration.

As has been previously described, in the preferred practice of the invention the opening through the dies is configured to allow reservoir 51 as shown in FIG. 29 to accommodate excess wedging flow as the tubular portion is shaped so that the dies can always fully close with the land's 56 and 58 in contact with each other. FIGS. 18 and 30 show the completed swaging operation by which the open swage socket 62 of FIGS. 11–17 has been secured to wire rope 60. The finished appearance after the open swage socket 62 has been attached to wire rope 60 is illustrated in FIGS. 15–18.

FIGS. 11–17 are illustrative of the application of the invention to an open swage socket. FIGS. 19–24 show the invention as applied to a closed swage socket. The application of the invention to either the open or closed swage socket is substantially identical, the swage sockets being different only in the end configuration by which another element, such as another length of line or a piece of equipment is attached to the end of a cable. In FIGS. 19–24, the numeral 86 generally indicates a closed swage socket that includes a body portion 88 and, integral with the body portion a toroid portion 90 having an opening 92 therein.

Integrally extending from body portion 88 in the direction opposite of toroid portion 90 is a tubular portion 94 that has an opening 96 therein, the opening receiving wire rope 60. As manufactured the tubular portion 94 has typically a cylindrical external surface 98. In the illustrated arrangement of FIGS. 19 and 20 the cylindrical external surface 98 has a reduced diameter end portion 100 that, as explained with reference to the open wedge socket application of the invention, is for the purpose of providing a visual identification of whether or not the tubular cylindrical portion of the swage socket has been treated, by swaging, to attach the swage socket to the end portion of wire rope 60. As previously stated, the use of the reduced diameter portion 100 of tubular portion 94 is optional and is not a part of this invention. When tubular portion 94 is subjected to the swaging operation the reduced diameter portion 100 essentially disappears so as to provide a visual indication that the swage socket has been securely fixed to the end of a length of wire rope.

The swage socket tubular portion 94 is subjected to the swaging operation as illustrated in FIGS. 25–30 as has been previously described with reference to the open swage socket of FIGS. 11–16. The result of the swaging operation is to change the tubular portion 94 of the swage socket to have a non-circular external configuration, the non-circular configuration being of a predetermined cross-sectional shape that is attained by a swaging operation as illustrated in FIGS. 25 and 30 in which the tubular portion 94 is rotated at least once during the swaging operation. In the arrangements illustrated for the open swage socket (FIGS. 11–18) and the closed swage socket (FIGS. 19–24) the preselected external configuration that is attained by the swaging operation is hexagonal surface. This is in conformance with the method of shaping a tubular member illustrated in FIGS. 5, 6, 6A, 7 and 9 and FIGS. 24–29. As previously stated, the predetermined external configuration can be other than hexagonal and may, for instance, be octagonal or may be of other preferred non-circular configurations.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A method of securing a termination element to a terminal end of a wire rope, the termination element having an elongated, ductile tubular sleeve portion and an integral socket portion, comprising:

positioning the terminal end portion of the wire rope within the tubular sleeve portion of the termination element, said sleeve portion having a cylindrical external surface;

positioning said sleeve portion of said termination element between co-acting dies, said dies having abuttable lands and having an opening that is quasi-polygonal in cross-section with n sides, where n is an even number greater than four, said co-acting dies having at least one of said sides forming a reservoir area wherein a pair of said reservoir areas are on oppositely facing sides said reservoirs accommodating flashing from said sleeve portion;

fully closing said dies upon said sleeve portion to form a preformed quasi-polygonal swage opening said dies;

rotating said sleeve portion with respect to said dies an amount V, where V is equal to 360° /n;

fully closing said co-acting dies whereby said lands abut to form a final quasi-polygonal opening of predetermined after swage dimension, said reservoir again accommodating flashing from the sleeve; and opening said dies to remove said swaged termination element, said swaged termination element having a quasi-polygonal external surface.

2. The method according to claim 1 wherein said termination element is an open swage socket having spaced apart paralleled integral tang portion from which said integral tubular sleeve portion extends.

3. The method according to claim 1 wherein said termination element is a closed swage socket having a body portion from which said integral tubular sleeve portion extends, the body portion having an opening therethrough.

4. The method of claim 1 where n equals 6.

5. The method of claim 1 wherein said after swage dimensions are that which will provide a working load limit including design factor rating for a given size of wire rope.

6. The method of claim 1 wherein the percentage of air gap in a completed swage is determined as follows:

$$\text{AIR GAP\%} = \frac{A_D - (2A_r + A_S)}{A_r} \cdot 100 = \le 40\%$$

where $A_r$ is the metallic rope area and $A_D$ is the cross-sectional area of the die cavity and $$A_s = (OD^2 - ID^2) \cdot \pi/4.$$

7. A method of securing a termination element to a terminal end of a wire rope, the termination element having an elongated, ductile tubular sleeve portion and an integral socket portion, comprising:

positioning the terminal end portion of the wire rope within the tubular sleeve portion of the termination element, said sleeve portion having a cylindrical external surface;

positioning said sleeve portion of said termination element between co-acting dies, said dies having abuttable lands, said dies having an opening that is quasi-polygonal in cross-section;

fully closing said co-acting dies upon said sleeve portion whereby said lands abut to form a predetermined quasi-polygonal cross-sectional swage;

opening said dies;

rotating said sleeve portion with respect to said dies an amount less than 180°;

fully closing said co-acting dies whereby said lands abut to form a final quasi-polygonal opening of predetermined after swage dimensions; and opening said dies to remove said swaged termination element.

8. The method according to claim 7 wherein said termination element is an open swage socket having spaced apart paralleled integral tang portions from which said integral tubular sleeve portion extends.

9. The method according to claim 7 wherein said termination element is a closed swage socket having a body portion from which said integral tubular sleeve portion extends, the body portion having an opening therethrough.

10. The method according to claim 7 wherein said opening in said dies has an internal cross-sectional configuration providing at least one reservoir are, said reservoir accommodating flashing from said sleeve portion.

11. The method of claim 7 wherein said after swage dimensions are that which will provide a working load limit including design factor rating for a given size of wire rope.

12. The method of claim 7 wherein the percentage of air gap in a completed swage is determined as follows:

$$\text{AIR GAP}\% = \frac{A_D - (2A_r + A_S)}{A_r} \cdot 100 = \leq 40\%$$

where $A_r$ is the metallic rope area and $A_D$ is the cross-sectional area of the die cavity and $$A_s = (OD - ID) \cdot \frac{\pi}{4}.$$

* * * * *